Oct. 13, 1925. 1,556,885
J. WHYTE
STEERING GEAR CONTROL UNIT
Filed May 17, 1920 3 Sheets-Sheet 3
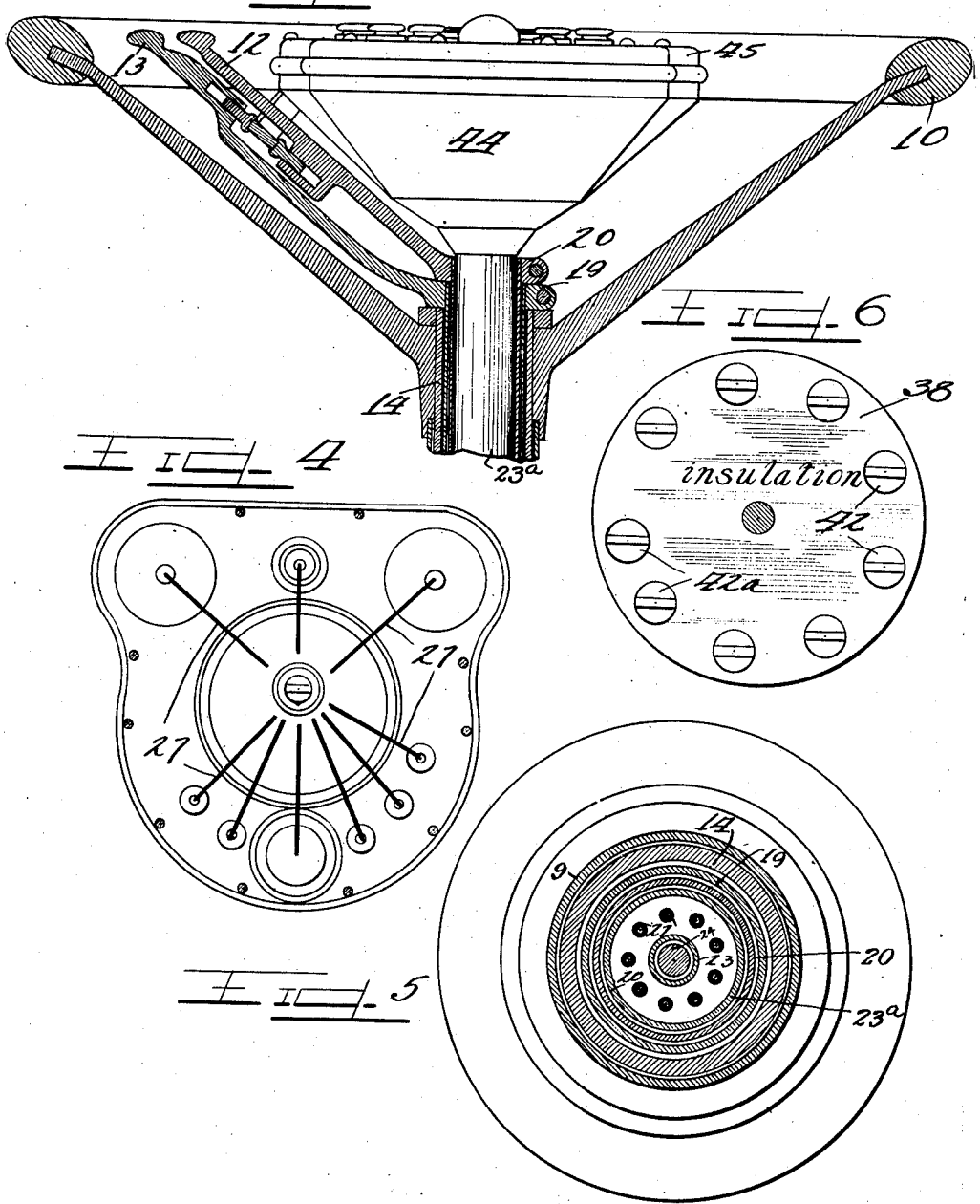

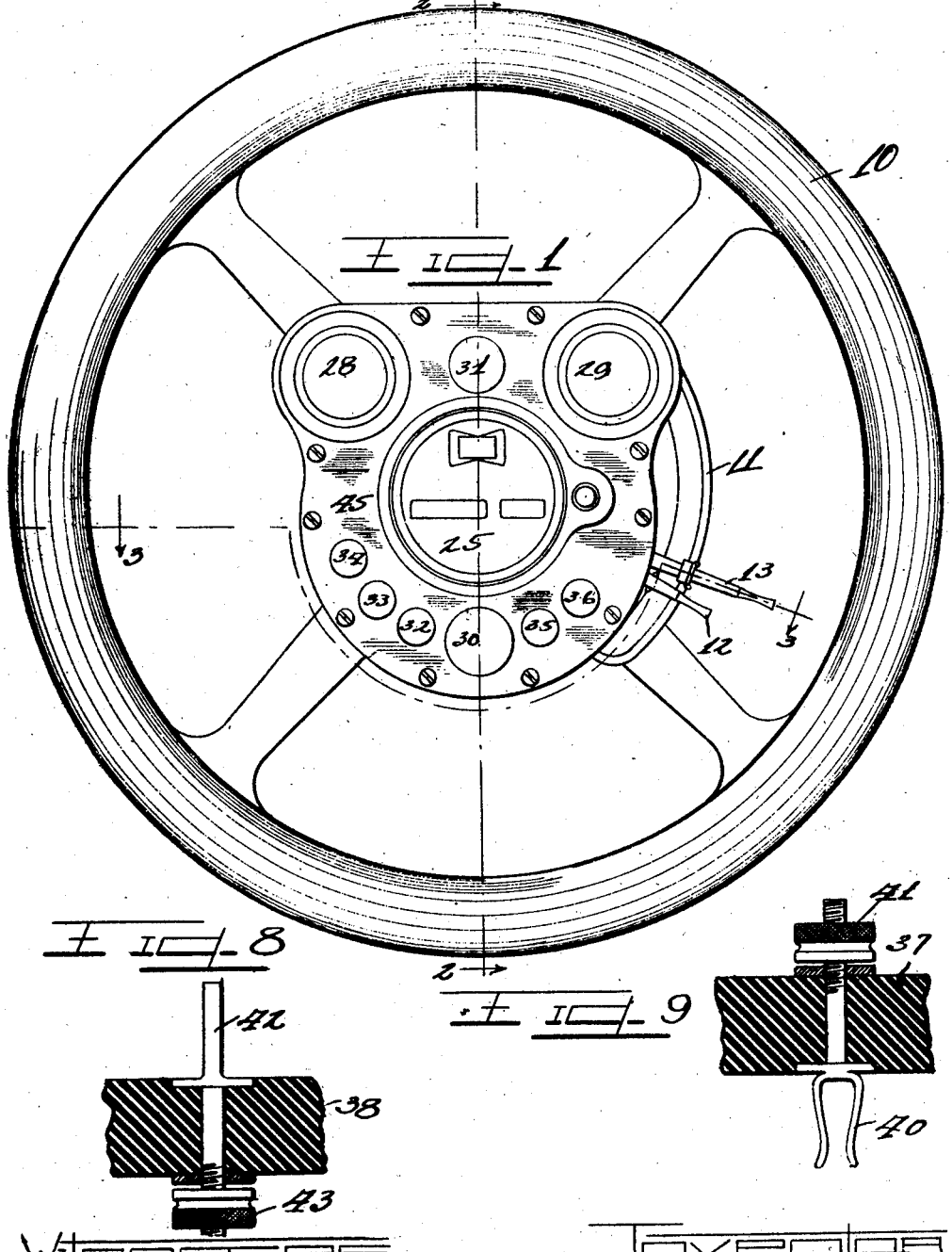

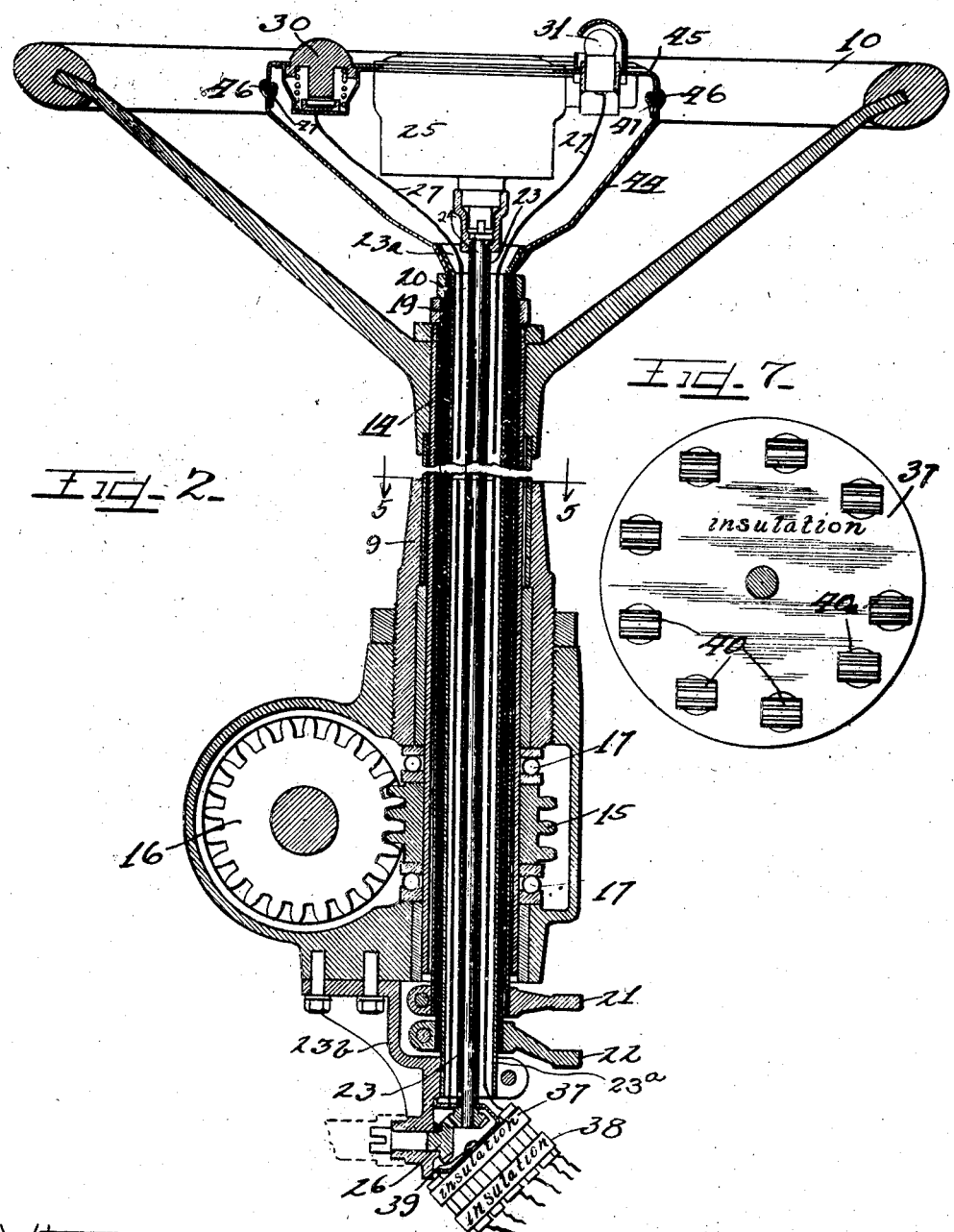

Patented Oct. 13, 1925.

1,556,885

UNITED STATES PATENT OFFICE.

JOHN WHYTE, OF CHICAGO, ILLINOIS, ASSIGNOR TO WHYTE MOTOR PRODUCTS COMPANY, A CORPORATION OF ILLINOIS.

STEERING-GEAR CONTROL UNIT.

Application filed May 17, 1920. Serial No. 381,791.

*To all whom it may concern:*

Be it known that I, JOHN WHYTE, a citizen of the United States, and a resident of the city of Chicago, in the county of Cook and State of Illinois, have invented certain new and useful Improvements in a Steering-Gear Control Unit; and I do hereby declare that the following is a full, clear, and exact description of the same, reference being had to the accompanying drawings, and to the numerals of reference marked thereon, which form a part of this specification.

This invention relates to a steering wheel having within its periphery all the control buttons and indicators necessary for the operation of the vehicle, craft, or aerial vehicle on which the steering wheel is mounted.

Hitherto the control button and indicators have been located on a dash board or special panel and were therefore not readily accessible to the driver. In some cases the control buttons were located in a box fastened on the steering column beneath the steering wheel, but this arrangement was found to be undesirable as any operation thereof necessitated dropping of the operator's hand from the wheel, and the sense of touch had to be mainly relied upon to distinguish the proper button, the front of the box not being visible from the driver's position. Also, in this case, only the control buttons were held in position on the steering column, the speedometer, oil gauge, ammeter, etc. remaining on the dash.

One of the objects therefore, of this invention is to provide a steering wheel having within its periphery all the instruments and indicators needful for the proper control of the mechanism on which the steering wheel is mounted.

Another object of the invention is to have the handles, buttons, and surfaces of the instruments and indicators all located in the plane of the wheel and therefore readily accessible.

A further object of the invention is to have all the devices compactly located so that the entire group may be readily illuminated so as to be visible at night.

Still another object of the invention is to support the case containing the instruments in such a manner that it is free from objectionable vibration.

Other and further important objects of this invention will be apparent from the disclosures in the specification and drawings.

The invention (in a preferred form) is illustrated in the drawings and hereinafter more fully described.

On the drawings:

Fig. 1 is a top plan view of the improved steering gear control unit.

Fig. 2 is a section through the steering column on the line 2—2 of Fig. 1.

Fig. 3 is a section through the steering wheel taken on the line 3—3 of Fig. 1, parts being omitted.

Fig. 4 is a plan view of the inside of the cover of the apparatus case showing the positioning of the wires.

Fig. 5 is a section on the line 5—5 of Fig. 2.

Fig. 6 is a plan view of a multiple knife blade switch for connecting the terminals of the wires at the foot of the steering post.

Fig. 7 is a plan view of the other terminal of the switch.

Fig. 8 is a detail view of one of the knife blade switches.

Fig. 9 is a view of a corresponding spring clip.

As shown on the drawings:

The reference numeral 10 indicates a steering wheel adjacent which is an ordinary quadrant 11 for the spark and throttle levers 12 and 13 respectively. The steering wheel is attached to a sleeve 14 which extends through the steering column 9 and is rotatable therein. At its lower end the sleeve 14 is provided with a worm gear 15 which coacts with a gear wheel 16 in the ordinary manner to operate the steering rod. The sleeve 14 and worm 15 are supported in bearings 17, as shown.

Co-axial with the sleeve 14 and fitting revolubly therein but slightly spaced therefrom and from each other are the sleeves 19 and 20 connected to the throttle and spark levers respectively. These sleeves are supported in bearings at the top and bottom of the steering column. Fixed to the lower ends of these sleeves are the levers 21 and 22 which are connected to the carburetor and the distributor in any ordinary manner.

Within the sleeve 20 is a fixed tubular member 23$^a$, the lower end of which is supported on a bracket 23$^b$, bolted to the steering case, and having mounted at its upper end a casing 44 carrying a speedometer 25.

Inside the member 23ᵃ and spaced therefrom is a fixed co-axial cylinder 23 through which passes a revoluble shaft 24 leading to the speedometer 25. This shaft 24 may be connected to the flexible speedometer driving shaft in any approved manner, here shown as by means of gears 26.

Between the member 23ᵃ and the cylinder 23 is provided a space for the passage of wires 27 leading to the various switches and indicators which may be arranged in any preferred manner. As shown, the reference numerals 28, 29, 30 and 31 indicate the ammeter, oil gauge, horn push button, and cowled lamp respectively. The numerals 32, 33, 34 represent the head, side, and tail light switches, while 35 and 36 represent the ignition and starting switches respectively.

It is understood that the arrangement herein set forth may be varied and locks applied thereto, etc., without departing from the spirit of the invention.

At the foot of the steering column is provided a means for simultaneously attaching or detaching all the connecting wires so that the entire steering assembly, or the engine of the automobile with the ignition system can be each removed independently of the other without the necessity of cutting the connecting wires. This attaching means is so arranged as to preclude the possibility of mistake in again connecting the different terminals.

Two plates 37 and 38 of hard rubber or equivalent insulating material are provided. The plate 37 is attached by a screw 39 to the foot of the steering column and at an angle thereto so as to be more readily accessible. This plate is provided with a suitable number of spring clip switch terminals 40 secured thereto by bolts and nuts 41 which are also adapted to secure the connecting wires. The plate 38 is provided with a corresponding number of knife blade switches 42 adapted to fit into and be positively gripped by the switch members 40. The knife blade switches are held in position on the plate 38 by means of terminal bolts and nuts 43. The switch terminals are not equally spaced around the circumference of the plates 37 and 38, corresponding members 40ᵃ and 42ᵃ being positioned closely together so that no connection can be made between the terminals unless the corresponding knife blade and clips are properly matched.

Thus there is avoided the trouble and inconvenience resulting from short circuits, wrong connections, etc. The switches, speedometer, and other instruments are enclosed in the case 44 covered by a plate 45. The plate 45 is supported on a cushion joint 46 of felt or the like which extends around the periphery of the case 44. This joint is provided with an internal ring 47 which holds the plate positively fixed in place, but allows of a cushioning action and protects the instruments from shocks and vibrations.

The operation is as follows:

The operation will be fully understood from the above specification. The sleeves 14, 19, and 20 are revoluble in each other and are therefore independently movable. The speedometer shaft operates inside the fixed cylinder 23, while the wires 27 connected to the different switches and instruments are suspended in the space between the sleeve 23ᵃ and the cylinder 23.

It will be seen that the steering wheel sleeve and the throttle and spark lever sleeves are movable independently of each other on account of the spaces therebetween which also allow for lubrication.

All the apparatus incidental to the driving of the machine is most convenient to the driver thereof, and being situated within the periphery of the steering wheel does away with the necessity of removing the hands from the wheel whenever any switches, lights, or push buttons are to be manipulated. Moreover, all the indicators, gauges, etc. are directly in front of the driver and can be readily observed. In the event of repairs all the connecting wires can be quickly and easily detached and without the need of marking the wires to insure against short circuits and wrong connections when replaced.

I am aware that numerous details of construction may be varied through a wide range without departing from the principles of this invention, and I therefore do not purpose limiting the patent granted otherwise than necessitated by the prior art.

I claim as my invention:

1. A steering wheel control unit, comprising a hollow steering column, a steering wheel, a sleeve attached to the steering wheel and rotatably positioned inside said hollow column, a throttle lever and a spark lever each having a sleeve rotatably positioned within said steering wheel sleeve, a fixed sleeve within said throttle and spark lever sleeves, a casing containing switches and indicators, including a speedometer, positioned on said inner fixed sleeve and disposed within the periphery of said steering wheel, and a speedometer driving shaft and a plurality of wires leading from said casing within said inner fixed sleeve.

2. A steering gear control unit, comprising a hollow steering column assembly, a steering wheel, a pair of sleeves rotatably mounted within the steering column and extending to the bottom thereof, a lever secured to each of said sleeves for rotating the same, a pair of stationary sleeves mounted inside said rotatable sleeves, a casing mounted on the outer stationary sleeve and disposed within the periphery of said steering wheel, a driving means extending through the inner stationary sleeve, a speedometer in the casing connected with said driving means, a plurality of conductors extending through and between said sleeves, and a plurality of instruments and switches in the casing connected with said conductors.

3. A steering gear control unit, comprising a steering wheel, a casing mounted inside the periphery of the wheel, and a plurality of control switches and indicators located in the casing, the top of the casing being in the plane of the wheel and resiliently supported thereon.

4. A steering gear control unit, comprising a hollow steering column assembly, a steering wheel thereon, a switch and indicator casing carried by a portion of the steering column assembly, a detachable connection embodying a switch structure located at the base of the steering column, and a plurality of wires passing through the column and connecting the casing and the detachable connection.

5. A steering gear control unit, comprising a hollow steering column assembly, a steering wheel thereon, a plurality of sleeves inside the column, a switch and indicator casing carried by a portion of the steering column assembly, a detachable connection embodying a switch structure located at the base of the steering column, and a plurality of wires passing through the column and connecting the casing and the detachable connection.

In testimony whereof I have hereunto subscribed my name.

JOHN WHYTE.